(12) United States Patent
Burrows et al.

(10) Patent No.: US 7,703,079 B1
(45) Date of Patent: Apr. 20, 2010

(54) SYSTEM PERFORMANCE PREDICTION

(75) Inventors: Andrew P. Burrows, Wilmslow (GB); Andrew M. Bowers, Wilmslow (GB)

(73) Assignee: Oracle America, Inc., Santa Clara, CA (US)

( * ) Notice: Subject to any disclaimer, the term of this patent is extended or adjusted under 35 U.S.C. 154(b) by 1387 days.

(21) Appl. No.: 11/120,901

(22) Filed: May 3, 2005

(51) Int. Cl.
*G06F 9/44* (2006.01)
*G06F 9/45* (2006.01)
*G06F 11/00* (2006.01)
*G06F 19/00* (2006.01)
*G06F 11/30* (2006.01)

(52) U.S. Cl. .......................... 717/127; 703/22; 714/47; 700/108; 702/182

(58) Field of Classification Search ................. 717/130, 717/127; 702/182; 700/108; 703/22; 714/47
See application file for complete search history.

(56) References Cited

U.S. PATENT DOCUMENTS

| | | | | |
|---|---|---|---|---|
| 5,303,166 A * | 4/1994 | Amalfitano et al. | ......... | 702/186 |
| 5,471,593 A * | 11/1995 | Branigin | ...................... | 712/235 |
| 5,732,273 A * | 3/1998 | Srivastava et al. | ........... | 717/130 |
| 5,768,500 A * | 6/1998 | Agrawal et al. | ................ | 714/47 |
| 5,953,689 A * | 9/1999 | Hale et al. | ................... | 702/186 |
| 6,374,367 B1 | 4/2002 | Dean et al. | | |
| 6,381,735 B1 | 4/2002 | Hunt | | |
| 6,405,327 B1 | 6/2002 | Sipple et al. | | |
| 6,453,269 B1 * | 9/2002 | Quernemoen | ................ | 702/186 |
| 6,505,249 B1 * | 1/2003 | Rehkopf | ..................... | 709/224 |
| 6,529,909 B1 * | 3/2003 | Bowman-Amuah | .......... | 707/10 |
| 6,560,569 B1 * | 5/2003 | Abu El Ata | ..................... | 703/2 |
| 6,609,216 B1 * | 8/2003 | Almy et al. | .................... | 714/25 |
| 6,622,221 B1 * | 9/2003 | Zahavi | ........................ | 711/154 |
| 6,721,941 B1 * | 4/2004 | Morshed et al. | ............. | 717/127 |
| 6,879,926 B2 | 4/2005 | Schmit et al. | | |

(Continued)

OTHER PUBLICATIONS

Malony, A.D. et al., "Performance Measurement Intrusion and Perturbation Analysis", Jul. 1992, IEEE Transactions on Publication, vol. 3, Issue 4, pp. 433-450, "http://ieeexplore.ieee.org/stamp/stamp.jsp?arnumber=149962&isnumber=3965".*
Zhao et al., "Predicting the Impact of Optimizations for Embedded Systems", Jun. 11-13, 2003, ACM SIGPLAN Notices, vol. 38, Issue 7, pp. 1-11.*

(Continued)

*Primary Examiner*—Wei Y Zhen
*Assistant Examiner*—Chih-Ching Chow
(74) *Attorney, Agent, or Firm*—Robert C Kowert; Meyertons, Hood, Kivlin, Kowert & Goetzel, P.C.

(57) ABSTRACT

Overall system performance improvements resulting from improvements to individual system components may be predicted by analyzing the effects of artificial performance degradations inserted into the individual components. Measuring and analyzing a negative overall system effect caused by negative changes to an individual component may predict a positive overall system performance improvement resulting from an improvement to the individual component of similar magnitude to the inserted negative changes. System performance prediction may be used to analyze and predict system performance changes related to various computing resources, such as execution time (speed), memory usage, network bandwidth, file I/O, and/or disk storage space, among others. Additionally, by comparing predicted system performance improvements resulting from potential improvements to various components of a software system, the individual components may be ranked according to the amount of improvement required to realize the predicted system performance improvements.

21 Claims, 9 Drawing Sheets

U.S. PATENT DOCUMENTS

| | | |
|---|---|---|
| 7,058,560 B1 * | 6/2006 | Arakawa et al. .............. 703/22 |
| 2004/0003375 A1 * | 1/2004 | George et al. ............... 717/124 |
| 2004/0122950 A1 | 6/2004 | Morgan et al. |
| 2004/0163079 A1 | 8/2004 | Noy et al. |
| 2005/0038833 A1 | 2/2005 | Colrain et al. |
| 2005/0076116 A1 | 4/2005 | Liu |
| 2005/0086029 A1 | 4/2005 | Casaaval et al. |
| 2006/0064481 A1 * | 3/2006 | Baron et al. ................ 709/224 |
| 2006/0224925 A1 * | 10/2006 | Lake ........................... 714/38 |

OTHER PUBLICATIONS

"A Modeling Study of the TPC-C Benchmark"; Scott T. Leutengger, Daniel Dias; ACM SIGMOD Record of the 1993 ACM SIGMOD International conference on Management of Data; SIGMOD '93, vol. 22, Issue 2, 10 pages.

\* cited by examiner

SYSTEM PERFORMANCE PREDICTION

BACKGROUND OF THE INVENTION

1. Field of the Invention

This invention related to the field of software performance analysis and more particularly to software system performance prediction by linear component perturbation.

2. Description of the Related Art

The performance of a software system is generally determined by the complex interaction of a large number of software components. Traditionally, in order to understand how to improve the performance of a system, a "critical path" through the system would normally have to be determined. In general, however, this is difficult or impossible due to the complex, non-linear, nature of the problem.

One of the major challenges facing any attempt at improving the performance of a complex software system is determining where to apply the effort. It is a relatively simple matter to determine which parts of the system are used by a given industry standard benchmark (e.g. SPECweb99, Netbench, TPC-C, etc.). It is quite another matter to determine how much the performance of that benchmark depends on each individual system component. In many cases, simple "microbenchmarks" are developed that test a single component of the system's behavior in seclusion. However, it is highly likely that component changes that have a significant impact in a microbenchmark will show little or no benefit for the larger, more complicated industry standard benchmark. In other words, changes that improve the performance of a single component may have little effect on a system's overall performance.

SUMMARY

Potential performance improvements to a software system may be predicted by analyzing the effects of artificial performance degradations inserted into individual components of the software system. By measuring the effect such artificial performance degradations have on the system as a whole, an amount of predicted system performance improvement related to potential performance improvements to a component may be determined. For instance, by analyzing the total system speed degradation caused by artificial delays inserted into one system component, it may be possible to predict overall speed improvements that would result from improving the execution speed of that component. In other words, by measuring and analyzing an overall system effect caused by negative changes to an individual component, positive overall system changes resulting from positive changes of similar magnitude to the inserted negative changes to the component may be predicted.

Additionally, by comparing predicted system performance improvements resulting from potential improvements to various components of a software system, the individual components may be ranked according to the amount of individual improvement required to realize the predicted performance improvements. For example, a 10% improvement in component A may result in a 2% improvement in the overall system, while a 25% improvement in component B may result in only a 1% overall system improvement. In some embodiments, individual system components may be ranked according to the improvement required in each component to realize a specific amount of improvement in the overall system. For instance, in the above example, it might require only a 5% improvement in component A to realize the same amount of overall system improvement as might be realized by a 25% improvement in component B. Thus, by applying development (or other) efforts according to such a ranking of system components, effort may be expended to improve those components with the potential to yield significant overall system performance improvements. This may be especially beneficial when allocating limited development resources to system improvement.

System performance prediction may be used, according to different embodiments, to analyze and predict system performance changes related to various computing resources, such as execution time (speed), memory usage, network bandwidth, file I/O, and/or disk storage space, among others. In general, system performance prediction may be used to analyze any shared resource used by multiple components of a software system. Additionally, system performance prediction may also be used to predict system improvements related to a specific system component. For example, an individual component, say component A, of a software system may utilize other different components (and/or language elements), say components B, C and D. Improving the performance of component A may involve improving the performance of one or more of components B, C and/or D. Thus, system performance prediction may be used to analyze the helper components to determine the relative potential for significant performance improvement in the individual components resulting from improvements in each of the helper components.

System performance prediction, as described herein, may involve using industry standard benchmarking applications, such as SPECweb99, Netbench, TPC-C, etc. For instance, an initial benchmark for the overall performance of the system may be measured before inserting any delays or performing any system performance predictions. A standard benchmark testing script may be developed and executed several times and the individual performance measurements may be averaged to determine the overall system benchmark measurement.

In addition, various statistical methods may be calculated at various points in the system performance prediction process and may be used to evaluate the validity of the predictions. For example, confidence intervals may be calculated and used to validate the specific data points used for system performance prediction, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Performance improvements to a software system may be predicted by analyzing the effects of artificial performance degradations inserted into individual components of the software system. By measuring and analyzing artificial performance degradations, an amount of predicted system performance improvement related to potential performance improvements to a component may be determined. For instance, by analyzing the total system speed degradation caused by artificial delays inserted into a system component, it may be possible to predict overall speed improvements that would result from improving the execution speed of the individual component. In other words, measuring and analyzing a negative overall system effect caused by negative changes to an individual component may be used to predict a positive overall system change resulting from positive changes to the individual component of similar magnitude to the inserted negative changes. For example, in one embodiment, the overall system degradation caused by inserting a delay into an individual component may predict the overall system improvements resulting from improving the speed of the individual component.

Additionally, by comparing predicted system performance improvements resulting from potential improvements to various components of a software system, the individual components may be ranked according to the amount of improvement required to realize the predicted performance improvements. For example, a 10% improvement in component A may result in a 2% improvement in the overall system, while a 25% improvement in component B may result in only a 1% overall system improvement. Additionally, in some embodiments, individual system components may be ranked according to the improvement required in each component to realize a specific amount of improvement in the overall system. For instance, in the above example, it might require only a 5% improvement in component A to realize the same amount of overall system improvement as realized by a 25% improvement in component B. Thus, by applying development (or other) efforts according to such a ranking of system components, effort may be expended to improve those components with the best potential to yield significant overall system performance improvements. This may be especially beneficial when allocating limited development resources to system improvement.

System performance prediction may be used, according to different embodiments, to analyze and predict system performance changes related to various computing resources, such as execution time (speed), memory usage, network bandwidth, file I/O, and/or disk storage space, among others. In general, system performance prediction may be used to analyze any shared resources used by multiple components of a software system. Additionally, system performance prediction may also be used to predict system improvements related to a specific system component. For example, an individual component, say component A, of a software system may utilize other different components (and/or language elements), say components B, C and D. Improving the performance of component A may involve improving the performance of one or more of components B, C and/or D. Thus, system performance prediction may be used to analyze the helper components to determine the relative potential for significant performance improvement in the individual components resulting from improvements in each of the helper components.

System performance prediction, as described herein, may involve using industry standard benchmarking applications, such as SPECweb99, Netbench, TPC-C, etc. For instance, an initial benchmark for the overall performance of the system may be measured before inserting any delays or performing any system performance predictions. A standard benchmark testing script may be developed and executed several times and the individual performance measurements may be averaged to determine the overall system benchmark measurement.

Additionally, for each analyzed system component, a baseline benchmark performance of the component may also be measured. For example, in one embodiment, a benchmark measuring application, such as SPECweb99, may be configured to record execution timing for just the component in question. Alternatively, individual timing instructions may be inserted into the component and used to determine baseline benchmark performance for the component and to measure the performance cost of timing the component. After establishing baseline performance measurements for both the overall system and an individual component to be analyzed, a delay may be inserted into the component. Subsequently, the performance degradation of both the specific component and the overall system resulting from the inserted delay may be measured. The value of an inserted delay may be increased and additional system performance measurements may be acquired. Thus, the measured performance degradations resulting from delays of various lengths may be measured and analyzed. For example, inserting a delay of 10% to a particular component may result in a 1% degradation of overall system performance while a delay of 20% may result in a 2% overall system performance degradation.

The relations of individual component changes (as a percentage of component performance) to overall system performance changes (as percentages of overall system performance) for multiple, different, delay times may be analyzed to determine the component performance improvement required to result in a specific improvement in overall system performance.

For example, when making system performance predictions regarding execution speed, a single delay of a particular value may be inserted into a program component and the value of that inserted delay may be varied during multiple system benchmark measurements. In other embodiments, however, multiple delays may be inserted into a single program component and the individual delay values may be varied for several system benchmark measurements. Alternatively, a single delay may be inserted into a component, and moved to different locations in the component between sets of benchmark measurements, with several different delay values used at each location. In general, however, a single delay inserted either at the beginning or end of a component may yield more consistent, stable results, according to some embodiments.

When analyzing resource usage for resources other than execution speed, each analyzed component may be instrumented to insert artificial usage of the analyzed resource. For example, in one embodiment, extra, artificial memory allocations may be inserted in to each analyzed component and the overall system memory usage analyzed to determine an overall degradation in memory usage (i.e. more memory being used) resulting from each inserted memory allocation.

In addition, various statistical methods may be calculated at various points in the system performance predication process and may be used to evaluate the validity of the particular predictions for specific components. For example, confidence intervals may be calculated and used to validate the specific data points used for system performance prediction, according to one embodiment.

In some embodiments, a specific set of components to be analyzed may be determined by examining the results of measuring a performance benchmark that includes the amount of resource usage time by various components of the system. For example, if a benchmark measurement demonstrates that a system spends a large portion of its execution time in a particular software component, that component may, in one embodiment, be a good candidate for applying system performance prediction regarding execution time, as described herein. Alternatively, in other embodiments, a benchmark measurement may illustrate that a few components make up most of the system's overall memory usage.

After inserting performance degradations into one or more system components and measuring the resulting overall system performance changes, the collected data may be analyzed to predict potential overall performance increases that may result from improvements in the analyzed components. For instance, in one embodiment a best-fit algorithm or function may be determined for the data representing the individual values of the artificial performance degradations vs. the resultant overall system changes. For example, in one embodiment, a straight line function may be determined through the data representing the value of artificial delays inserted into a component vs. the resulting decrease in overall system execution speed. In some embodiments, the data representing both the value of inserted performance degradations and the resulting overall system changes may be expressed and analyzed as percentages. For instance, the value of a delay inserted into a component may be expressed as a percentage of the component's benchmark measurement of execution time or speed. Similarly, the overall system performance change may be expressed as a percentage of the system's benchmark performance.

After determining a best-fit algorithm, that algorithm may be extrapolated to predict performance improvements resulting from improvements to individual components. For instance, if a 10% degradation of a component's performance results in a 1% degradation of overall system performance, extrapolating a best-fit algorithm, such as a straight line function, through the data for the component's performance measurements may predict that a 10% improvement in the component's performance may result in a 1% improvement in the system's overall performance. In order to improve the predictive value of system performance prediction, multiple performance measurements may be taken with different values or magnitudes of performance degradation in an individual component. For example, in one embodiment, the overall performance change resulting from delays ranging in value from 5% to 50% of a component's benchmark execution time may be measured and used to predict system performance improvements resulting from improvements in the components execution time. Thus, for each component analyzed using system performance prediction, multiple performance degradations of varying magnitudes may be inserted and the resulting system performance changes measured.

System performance prediction may be implement as a software tool. Thus, a system performance predictor application, such as system performance predictor 120 in FIG. 1, may implement system performance prediction, as described herein, including determining benchmark performance measurements for a system as a whole and for individual components of the system, inserting artificial performance degradations into system components, measuring the effect of the artificial degradation on the system's overall performance, and analyzing the relationships between the artificial degradations and the resultant system performance changes to predict system performance improvements that might result from corresponding improvements in individual system components.

Figure 1:
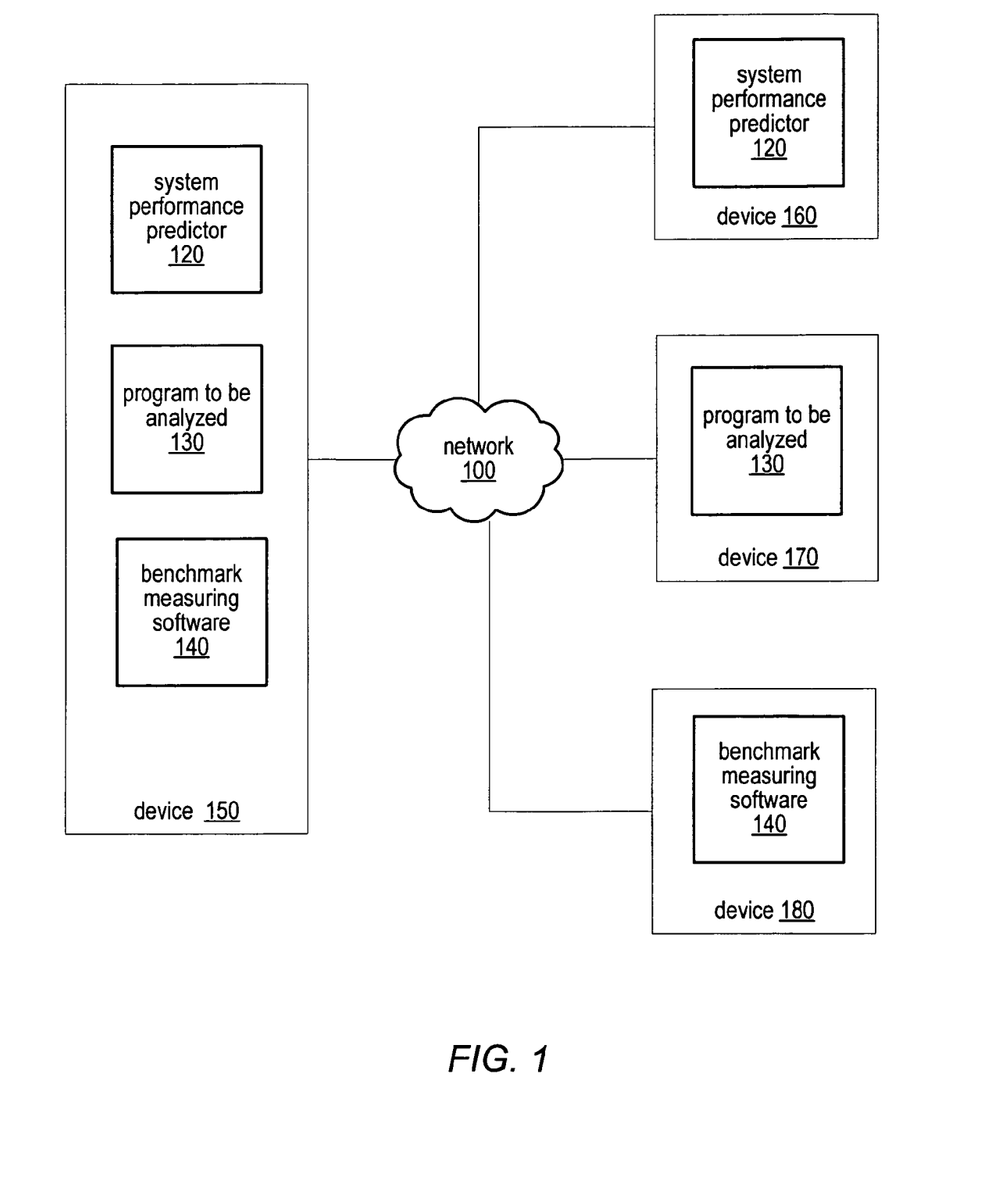
FIG. 1 is a block diagram illustrating networked computer systems capable of implementing system performance prediction as described herein, in one embodiment.

Computer implemented system performance prediction may be developed using various types of computer systems, as illustrated by FIG. 1. FIG. 1 illustrates system performance prediction implemented both on a single device 150 and implemented across multiple devices 160, 170, and 180. For instance, device 150 includes a system performance predictor 120, a program to be analyzed 130 and benchmark measuring software 140. Benchmark measuring software 140 may represent, according to different embodiments, any of various benchmark applications, processes or systems. For example, in one embodiment, benchmark measuring software 140 may be an industry standard benchmark application, such as SPECweb99, Netbench, TPC-C, etc. In other embodiments, however, benchmark measuring software 140 may be a custom application configured to measure the performance of a software system. In yet other embodiments, part of system performance predictor 120 may include functionality to measure the performance of a software system and thus benchmark measuring software 140 may be part of system performance predictor 120.

When predicting system performance, as described herein, system performance predictor 120 may utilize other programs or libraries to perform various parts of system performance prediction. For example, in one embodiment, system performance predictor 120 may automate or otherwise interact with benchmark measuring software 140 to determine, measure, and/or record the performance of a program, application, or other software system, such as the program to be analyzed 130. System performance predictor 120 may also interact with benchmark measuring software 140 via any of a number of different mechanisms, according to various embodiments. For instance, in one embodiment, benchmark measuring software 140 may expose a programming API and system performance predictor 120 may be configured to call various functions or methods of the API via any of various inter-process communications mechanisms, such as via a remote method invocation mechanism. Alternatively, in another embodiment, benchmark measuring software 140 may include a library of software routines that provide benchmarking and/or performance measuring functions and system performance predictor 120 may be configured to directly call functions and/or methods from such a library. As various methods of inter-process control and communication are well known in the art and as any such mechanism may be included as part of system performance prediction, such mechanisms are not described in detail herein.

In other embodiments, system performance predictor 120 and benchmark measuring software 140 may reside and/or execute on separate devices, such as device 160 and device 180, respectively. System performance predictor 120 may also communicate and/or interact with benchmark measuring software 140 via one or more network communication protocols, according to some embodiments. For example, in one embodiment, benchmark measuring software 140 may implement a remote procedure call mechanism. In other embodiments, however, benchmark measuring software 140 may be accessible via one or more web services interfaces or may be accessible via a custom TCP/IP messaging protocol. In general, system performance predictor 120 may communicate with other applications or utilities via any of various well-known inter-process communication mechanisms.

When predicting system performance, system performance predictor 120 may be configured, in one embodiment, to utilize benchmark measuring software 140 to determine a benchmark measurement for program to be analyzed 130. For example, in some embodiments, a test execution script may be used by system performance predictor 120 and/or benchmark measuring software 140 to exercise functionality of program to be analyzed 130. Thus, when later performance measurements are determined and compared to earlier benchmark measurements, the various performance measurements may represent equivalent execution paths through the program to be analyzed 130.

In some embodiments, system performance predictor 120 may determine, such as via benchmark measuring software 140, a benchmark performance measurement of the entire program to be analyzed 130. In other embodiments, however, system performance predictor 120 may determine a benchmark performance measurement for one or more individual components of the program to be analyzed 140, either in addition to or instead of a performance measurement for the entire program to be analyzed 140.

When determining performance measurements, either for individual portions of a program or an entire system, system performance predictor 120 may determine an average or mean performance measurement from multiple independent performance measurements. Using average or mean performance measurements may, in some embodiments, minimize the possible effects of performance problems unrelated to the actual software being measured. For example, if only a single performance measurement is measured, a problem with the hardware on which the software is executing, such as memory programs, storage device, issues, and/or network delays, may cause the performance measurement to be unreliable as a measurement of the actual software being executed.

In some embodiments, the specific components to be analyzed may be determined by examining the results of executing an industry benchmark including an amount of time that is spent in various components of the system. For example, if a benchmark measurement demonstrates that a system spends a large portion of its execution time in a particular software component, that component may be a good candidate for applying system performance prediction, as described herein.

Figure 2A:
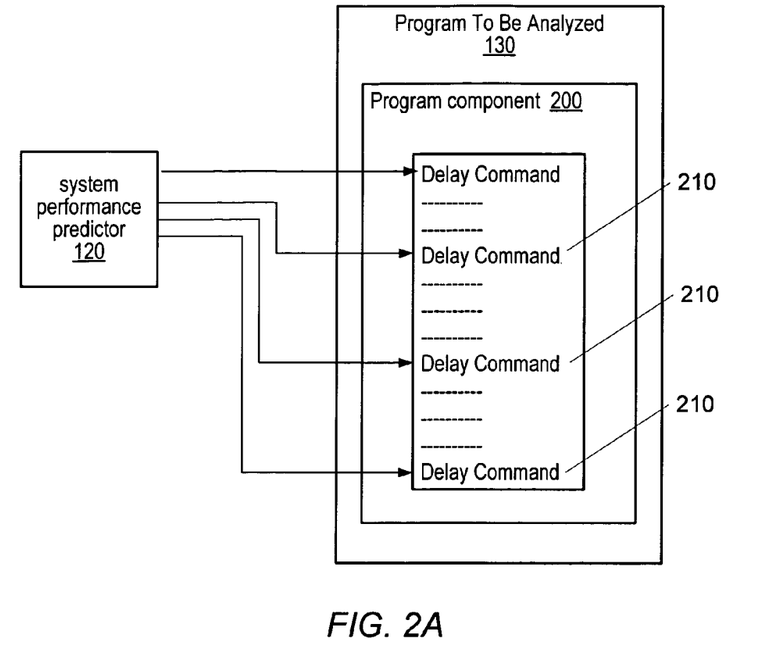
FIG. 2A is a block diagram illustrating, according to one embodiment, a system performance predictor inserting delays into a system component.

As described above, when performing system performance prediction with regard to execution time or speed, after measuring a benchmark performance value for a program to be analyzed 130, system performance predictor 120 may insert a delay into a component of the program to be analyzed 130. FIG. 2A illustrates, according to one embodiment, system performance predictor inserting delays 210 into program component 200 of program to be analyzed 130. System performance predictor 120 may insert delays into program component 200 using various types of programming instructions. In one embodiment, system performance predictor 120 may instrument the program to be analyzed 130 and thus may insert program instructions configured to cause a delay of a certain amount of time in program component 200. Alternatively, system performance predictor 120 may modify the source code of program component 200 to insert program instructions configured to cause one or more delays in program component 200 and subsequently recompile (and relink) program component 200 and/or program to be analyzed 140, according to one embodiment.

In general, the exact methods of inserting delays, or other performance degrading instructions, into a program component, such as program component 200 in FIG. 2A, depends upon the programming language in which program to be analyzed 130 is developed. For instance, inserting additional instructions into program developed using an interpreted programming language may be easier and may not require any additional compiling or linking, whereas adding instructions to other languages, such as C/C++ may involve either sophisticated "instrumenting" or re-compiling and re-linking, or both.

The value of each delay may be determined based on any of various criteria. For example, the values for each individual time delay may be determined based upon percentages of the overall execution time spend in a component. For example, in one embodiment, the largest time delay inserted into a component may be equal to 50% of the total execution time of the component and other delays may be smaller percentages or percentages of the largest determined time delay.

After inserting the delay(s) into program component 200, system performance predictor 120 may, in some embodiments, execute program to be analyzed 130 to determine a performance measurement including the inserted delays. As when measuring an initial benchmark performance measurement, when making subsequent performance measurements, system performance predictor 120 may actually record several performance measurements and calculate a mean or average performance measurement instead of relying upon only a single measurement.

Figure 2B:
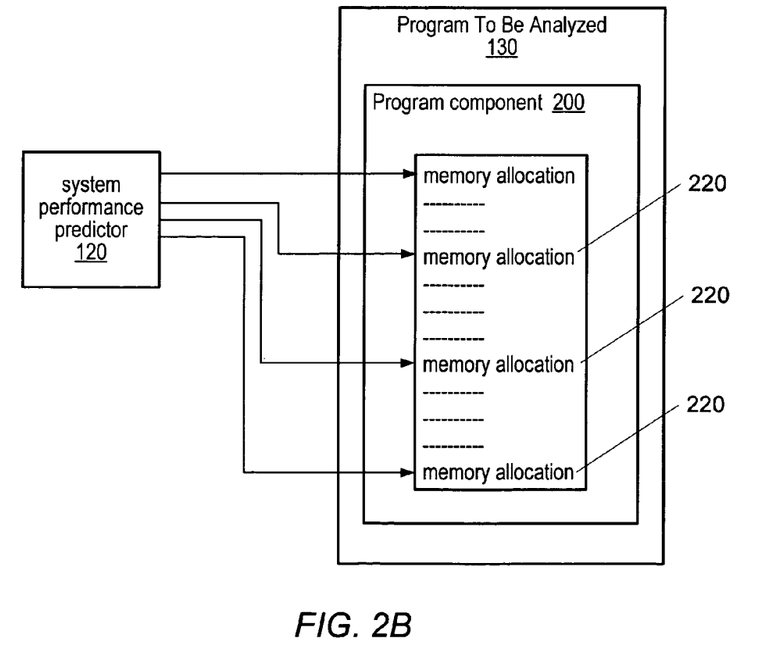
FIG. 2B is a block diagram illustrating, according to one embodiment, a system performance predictor inserting memory allocations into a system component.

As described above, system performance prediction may be used to analyze any of various types of system resource usage. For example, FIG. 2B illustrates, according to one embodiment, system performance predictor 120 performing system performance prediction in regard to memory usage in program to be analyzed 130. Thus, system performance predictor 120 may insert one or more memory allocations 220 into program component 200 of program to be analyzed 130. As described above regarding inserting delays, system performance predictor 120 may insert memory allocations into program component 200 using various types of programming instructions. In one embodiment, system performance predictor 120 may instrument the program to be analyzed 130 and thus may insert program instructions configured to cause memory allocations of a certain size in program component 200. Alternatively, system performance predictor 120 may modify the source code of program component 200 to insert program instructions configured to cause one or more memory allocations in program component 200, according to one embodiment.

As with execution time, the values for inserted memory allocations (or other resource usages) may be determined based upon the total memory usage of the component. Thus, memory allocations representing various values up to and including 100% of the benchmark memory usage for the component may be used, according to some embodiments.

Figure 3:
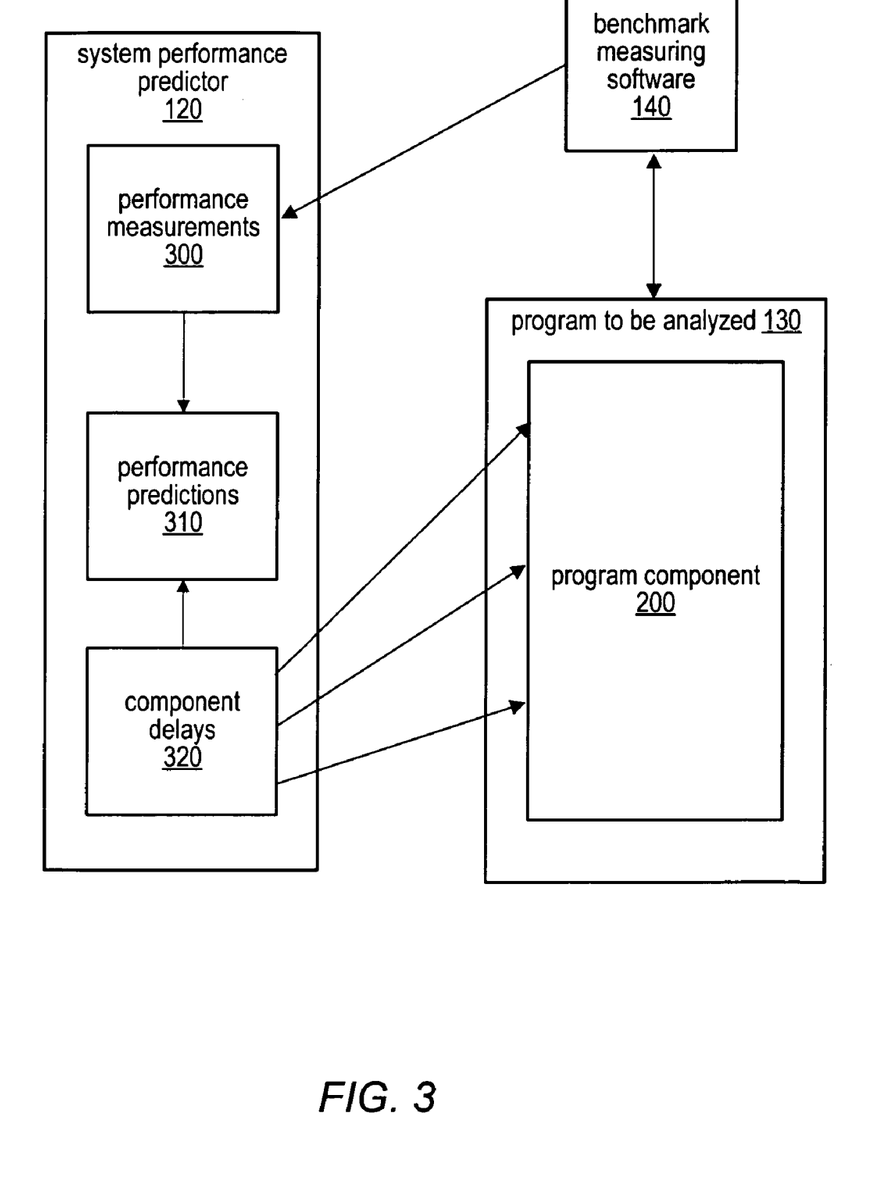
FIG. 3 is block diagram illustrating a system performance predictor using the performance measurements as part of predicting system performance, in one embodiment.

For example, as illustrated in FIG. 3, system performance predictor 120 may insert component delays 320 into program component 200 and use the performance measurements 300 from benchmark measuring software 140 along with component delays 320 to determine performance predictions 310. While FIG. 3 is discussed in regard to analyzing the execution time or speed of program to be analyzed 130, it should be noted that other forms of resources and resource usage may also be analyzed using system performance prediction, as described herein and may include that functionality, method, processes, etc. described regarding FIG. 3.

In some embodiments, system performance predictor 120 may make several iterations of inserting delays into the program to be analyzed and measuring corresponding performance measurements. Thus, system performance predictor 120 may collect several sets of data corresponding to differences in system performance resulting from delays of different amounts of time in program component 200. For example, system performance predictor 120 may determine five different performance measurements each corresponding to a delay of a different length. As noted above, each of the five performance measurements may, in fact, represent a mean or average performance measurement resulting from multiple benchmark execution measurements.

System performance predictor 120 may use both the values of the inserted delays and the resultant performance measurements to determine a set of performance deltas, or differences, expressed as percentages of an original system benchmark measurement. Thus, in one example, a delay equaling 10% of the performance of program component 200 may result in 1% degradation in the overall performance of the program to be analyzed 130. After recording several such pairs of values (delays and corresponding performance changes), system performance predictor may determine a best-fit algorithm through the data.

Figure 4:
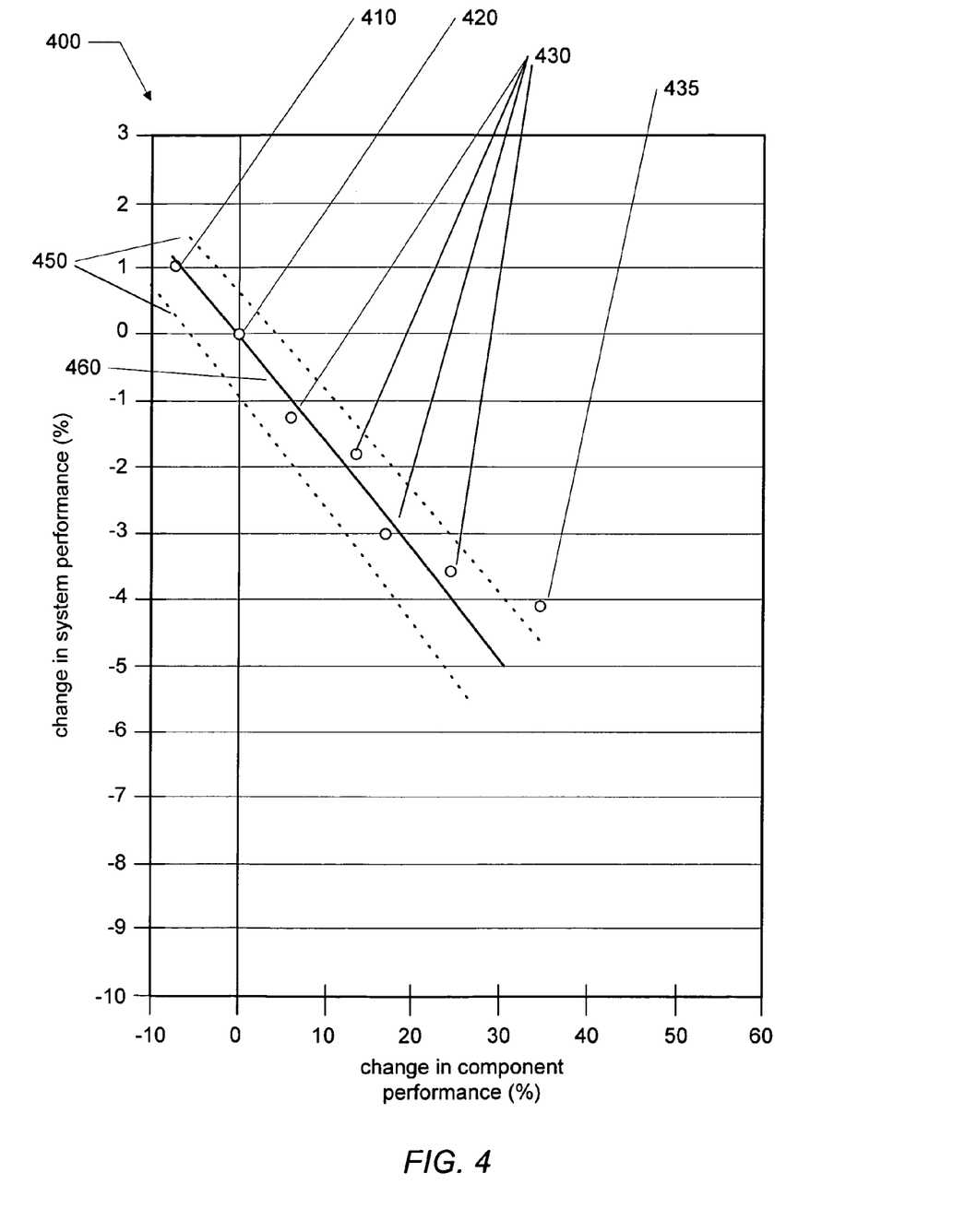
FIG. 4 is a two-dimensional graph illustrating system performance prediction, according to one embodiment.

For example, in one embodiment, system performance predictor 120 may measure performance changes corresponding to a 10%, a 20%, and a 30% delay in program component 200. System performance predictor 120 may then determine a straight-line as a best-fit algorithm through the resultant data, as illustrated by FIG. 4, described below. As described above, system performance predictor 120 may extrapolate, using a determined best-fit algorithm, one or more predicted performance increases that may result from increasing the performance of program component 200. For instance, using the example above, system performance predictor 120 may extrapolate the determined straight line to predict that a 10% increase in the performance of program component 200 may result in a 1% increase in overall system performance of program to be analyzed 130.

In some embodiments, system performance predictor 120 may predict performance increases corresponding to potential performance increases in a number of different components of a system or program being analyzed. In one embodiment, system performance predictor 120 may be configured to analyze most, or even all, components of a program or system in order to determine one or more components that, if improved, may result in the most overall system performance increases of the analyzed components. In other embodiments, a user, such as a developer or system administrator, may specify, such as via a user interface of system performance predictor 120, one or more components to be analyzed and thus, system performance predictor 120 may be configured to analyze and rank the specified components according to each component's relative potential to increase overall system performance (through performance improvements in the individual components).

Additionally, by comparing the potential overall system performance improvement resulting from potential speed increases to various components of a software system, the various components may be ranked according to a ratio of effort required to realize the amount of overall system performance improvement. Thus, developmental effort may be expended to improve those components with the best potential to yield significant overall system performance improvements. This may be especially beneficial when allocating a limited amount of development resources to system improvement.

System performance prediction, as described herein, may involve using an industry standard benchmarking application, such as SPECweb99, Netbench, TPC-C, etc. Initially, an initial benchmark for the overall performance of the system may be measured. For instance, a standard benchmark testing script may be developed and executing several times and the individual performance measurements may be averaged to determine the overall system benchmark measurement.

Additionally, for each component to be analyzed, the baseline benchmark performance of the component may also be measured. After establishing baseline performance measurements for both the overall system and a component to be analyzed, a delay may be inserted into the component to be analyzed. Then, the performance degradation of both the specific component and the overall system may be measured. As described above, rather than simply measuring a single execution performance, multiple benchmark measurements may be averaged and the average used as an overall performance measurement.

The delay inserted into the component may be increased and additional average benchmark performance measurements may be acquired. Thus, the measured performance degradations resulting from delays of various lengths may be mapped and analyzed. For example, inserting a delay of 10% to a particular component may result in a 1% degradation to overall system performance while a delay of 20% may result in a 2% overall system performance degradation. The relations of component delay times (as a percentage of component execution time) to overall system performance changes (as percentage) for multiple, different, delay times may be analyzed to determine the component-specific improvement required to result in a specific, say 1%, improvement in overall system performance.

In some embodiments, a single delay of a particular value may be inserted into a program component and the delay value of that inserted delay may be varied during several system benchmark measurements. In other embodiments, however, multiple delays may be inserted into a single program component and the individual delay value may be varied for several system benchmark measurements. Alternatively, a single delay may be inserted into a component, and moved to different locations in the component between sets of benchmark measurements, with several different delay values used at each location.

One method for analyzing component delay times and resulting overall system performance changes may include calculating best-fit algorithms, such as a straight line, for the data (e.g. performance degradation values vs. resulting system performance changes as percentages). For example, the percentage increase in component execution time due to inserted delays may be mapped onto the X axis of a two dimensional graph and the overall performance changes resulting from those delays may be mapped onto the Y axis of the same graph. Thus, the resulting graph 400 (See FIG. 4) may include a number of points 430 and 435 representing the pairing of component delays to overall system performance changes. After determining a best-fit algorithm, such as a straight line 460, through the resulting data points, the best-fit algorithm may be extended across the Y axis into negative X values. For example, a straight line function through the data points may be extended across the Y axis into the negative X axis range. Negative values along the X axis in the example illustrated in FIG. 4 represent negative delays or, in other words, improvements in the execution speed of the component. The best-fit algorithm may be used to determine the amount of component performance increase required to realize a particular amount of overall system performance improvement. As can be seen from point 410 from FIG. 4, a 10% improvement to one component may result in a 1% predicted overall system performance improvement.

While the foregoing example used a two-dimensional graph, as illustrated in FIG. 4, in some embodiments, the data may not actually be physically graphed or displayed. In some embodiments, the component delays and the resulting system performance changes may be analyzed, such as by system performance predictor 120, without actually creating (or displaying) an actual graph of the data. Although, in some embodiments, system performance predictor 120 may be configured to display and/or print such graphs to visually represent the data, the analysis process, and the actual system performance predictions and the amount of component improvement required to realize the predictions.

In addition, various statistical methods may be calculated at various points in the system performance prediction process and may be used to evaluate the validity of the particular predictions for specific components. For example, confidence intervals 450 may be calculated, as illustrated in FIG. 4, and used to validate the data points being analyzed. FIG. 4 illustrated five (5) data points (430 and 435) representing various delays times in a component and the respective system performance changes resulting from those delays. Confidence intervals 450 may be calculated and used to validate the data points. For instance, FIG. 4 illustrates one data point 435 that falls outside confidence intervals 450, and thus, in one embodiment, may be discarded and not used for system performance prediction. In other embodiments, however, data that lie outside of confidence intervals 450 may be used for system performance prediction.

Please note that while FIG. 4 and the above discussion refer to delays and predicting system speed improvements, other resources and resource usage, such as memory, storage space, network bandwidth, etc. may also be analyzed and predicted, as described herein.

Figure 5:
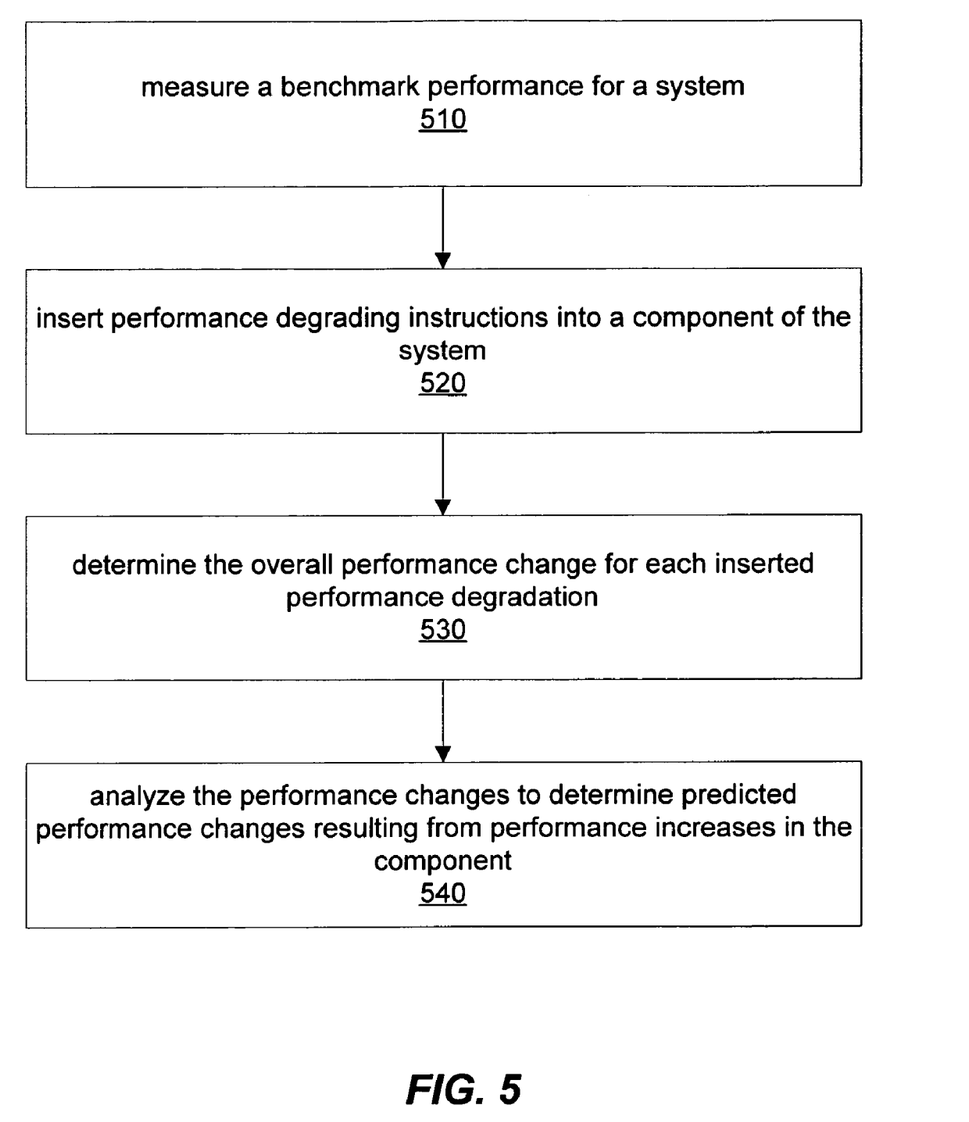
FIG. 5 is a flowchart illustrating one embodiment of a method for system performance prediction, as described herein.

FIG. 5 is a flowchart illustrating one embodiment of a method for system performance prediction, as described herein. As described above, system performance predictor 120 may be configured, in one embodiment, to measure a benchmark performance for a system, such as program to be analyzed 130, as illustrated by block 510. When determining a baseline performance measurement, system performance predictor 120 may be configured to utilize or automate a benchmark measuring software 140, via any of various inter-process communication and automation means, as described above.

In one embodiment, system performance predictor 120 may measure a performance benchmark for the entire software system to be analyzed, while, in other embodiments, system performance predictor 120 may be configured to also measure performance benchmarks for one or more individual components or portions of the system to be analyzed. Benchmark performance measurements may be determined regarding any of various system resources and resource usage, as described above. Thus, in one embodiment a benchmark of overall system execution time or speed may be measured, while, in another embodiment, a benchmark of a system's overall memory usage may be determined.

After recording one or more benchmark performance measurements for program to be analyzed 140, system performance predictor 120 may insert one or more performance degrading instructions into a component of the system, as illustrated by block 520. For instance, in one embodiment, system performance predictor 120 may initially insert a performance degradation, such as a delay, into program component 130 and may then measure the change in overall system performance resulting from the inserted degradation, as indicated by block 530. In some embodiments, system performance predictor 120 may repeatedly increase the magnitude of the inserted degradation, such as by increasing the time of an inserted delay and, for each such increase in magnitude, measure the change in overall system performance.

As noted above, system performance predictor 120 may, in some embodiments, collect the performance measurements from benchmark measuring software 140. In other embodiments, however, system performance predictor 120 may measure system performance itself, such as by inserting performance measuring instructions into components of program to be analyzed 130.

Once system performance predictor 120 has collected the performance changes corresponding to the inserted performance degrading instructions in program component 200, system performance predictor 120 may, in some embodiments, be configured to analyze the performance changes to determine one or more predicted performance changes resulting from performance increases in the program component, as illustrated in block 540. For example, system performance predictor 120 may determine a best-fit algorithm through the collected data and extrapolate, using the determined best-fit algorithm, one or more predicted overall system performance increases resulting from potential component performance increases, as described herein.

While the method illustrated by the flowchart in FIG. 5 is described above in terms of a software based system performance predictor 120, in some embodiment, one or more steps of such a method may be performed manually to implement system performance prediction, as described herein. However, software implemented system performance prediction, such as via system performance predictor 120, may provide more results more quickly than determining the same predictions manually.

Figure 6:
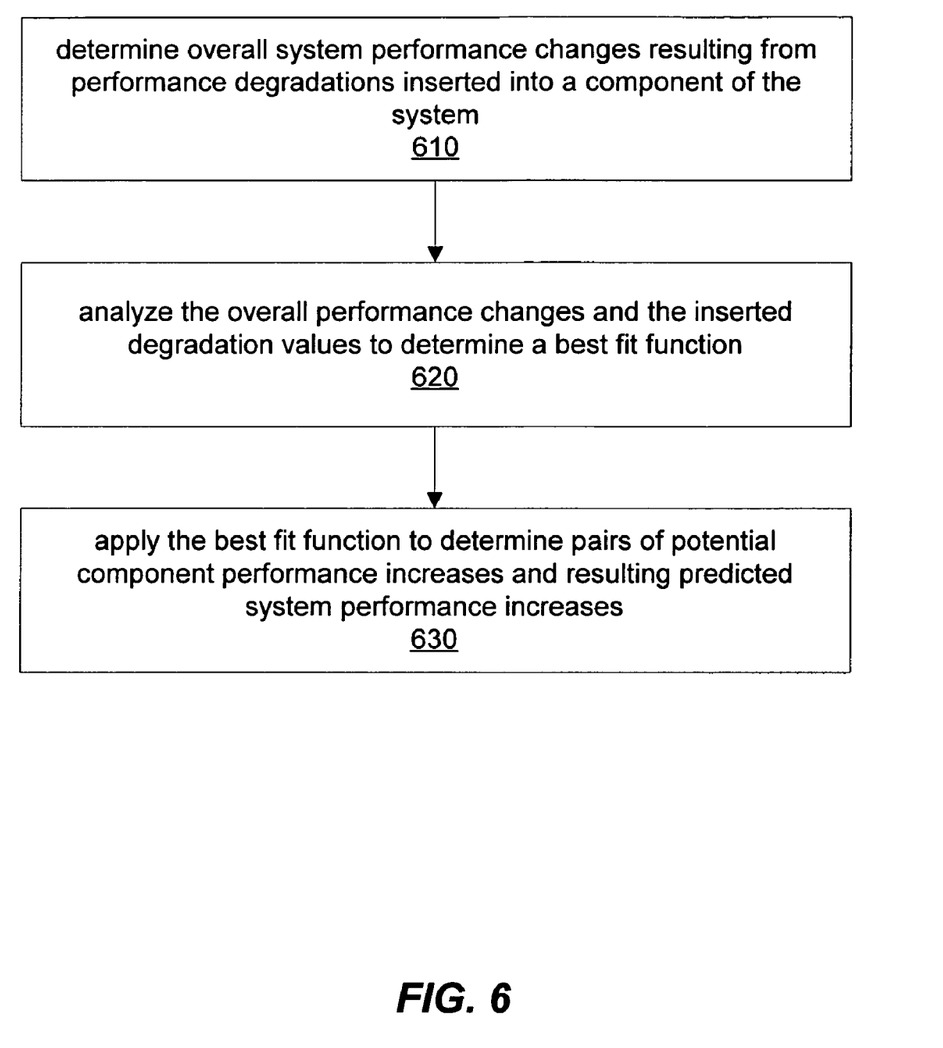
FIG. 6 is a flowchart illustrating one embodiment of a method for using a best fit function in system performance prediction, as described herein.

FIG. 6 is a flowchart illustrating one embodiment of a method for analyzing the inserted degradation values and the resultant system performance changes to make system performance predictions. For example, system performance predictor 120 may determine overall system performance changes resulting from degradations inserted into a component of the system, as described above, and illustrated by block 610. For instance, in one embodiment, when performing system performance predictions regarding system execution time or speed, system performance predictor 120 may be configured to determine overall system performance changes resulting from delays inserted into a system component. Alternatively, in another embodiment, when performing system performance predictions regarding memory usage, system performance predictor 120 may be configured to determine overall system performance changes resulting from memory allocations inserted into a system component.

Additionally, system performance predictor 120 may analyze the overall performance changes and the inserted degradation values to determine a best-fit algorithm for the degradations and the corresponding recorded performance changes, as indicated by block 620. For example, when performing system performance predictions regarding execution time or speed, system performance predictor 120 may analyze the values of inserted delays and the resulting overall system performance changes to determine a best-fit algorithm, as described above. Alternatively, when analyzing system memory usage, system performance predictor 120 may be configured to analyze the size of inserted memory allocations and the resultant changes in overall system memory usage to determine a best-fit algorithm.

In one embodiment, the determined best fit function may be a straight line function and by using potential performance increases in the relevant component, system performance predictor 120 may use the determined straight line function to calculate (i.e. predict) the potential overall system performance increases resulting from those component performance increases. Alternatively, system performance predictor 120 may be configured to use desired overall system performance increases to determine a predicted required component performance increase required to obtain the desired system performance increase. For example, by extrapolating, using a determined best-fit algorithm, such as a straight-line function, system performance predictor 120 may determine that a 10% speed increase in one component may result in a 1% overall system speed increase. Alternatively, system performance predictor 120 may determine that a 10% reduction is memory usage in an individual component may result in a 1% overall reduction in memory usage for the system as a whole. Thus, in some embodiments, system performance predictor 120 may be configured to apply a best-fit algorithm to determine pairs of potential component performance increases and resulting predicted system performance increases as noted in block 630 of FIG. 6.

Figure 7:
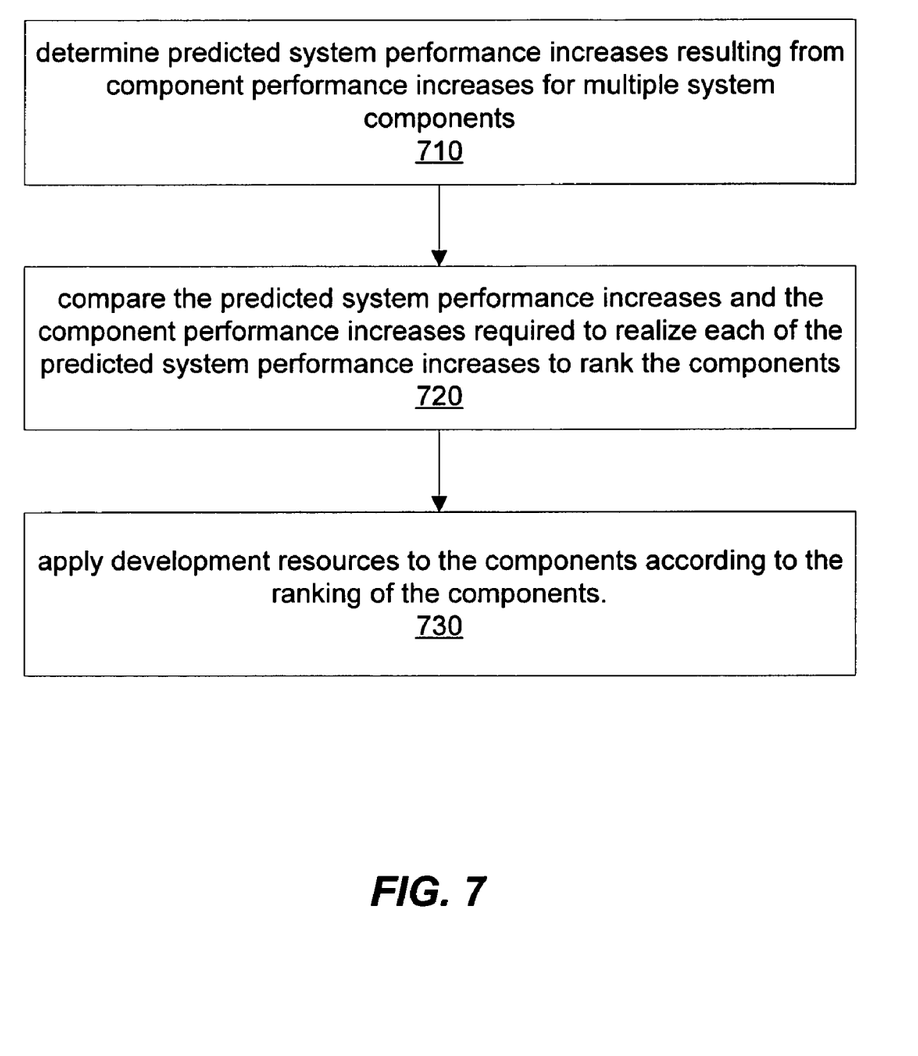
FIG. 7 is a flowchart illustrating one embodiment of a method for applying development resources according to predicted system performance results, as described herein.

FIG. 7 is a flowchart illustrating one embodiment of a method for applying development resources based upon system performance predictions. According to some embodiments, after determining one or more predicted system performance increases resulting from potential component performance increases for multiple system components, as illustrated by block 710 and described above, the individual components of the system may be ranked by comparing the predicted system performance increases and the potential component performance increases required to realize each of the predicted system performance increases, as illustrated by block 720.

For example, in one embodiment, the individual performance increases required in a single component to realize a predicted overall system performance increase may be compared for various components to rank the components according to each components potential to realize the overall predicted system performance increase. For instance, if a 1% overall system speed increase requires a 10% speed increase in component A or a 20% speed increase in component B, the two components may be ranked accordingly.

According to some embodiments, development resources may be applied to the various components of a system according to the ranking of the components, as illustrated by block 730. Thus, in the example above, disregarding the potential differences in obtaining speed increases in different components, obtaining the predicted 1% overall speed increase may require fewer develop resources if those resources are applied to improving component A versus component B.

In some embodiment, the relative difficulty of obtaining speed increases in various components may be taken into account with ranking components or when applying development resources. For instance, if obtaining a 10% speed increase in component A required twice as many development resources as obtaining a 20% speed increase in component B, corresponding weights may be applied to each component when ranking them, as described above. Alternatively, such weights may be applied when determining the amount of development resources required to obtain performance increases in individual system components, and the components may be re-ranked to take such differences in required development resources into account.

Figure 8:
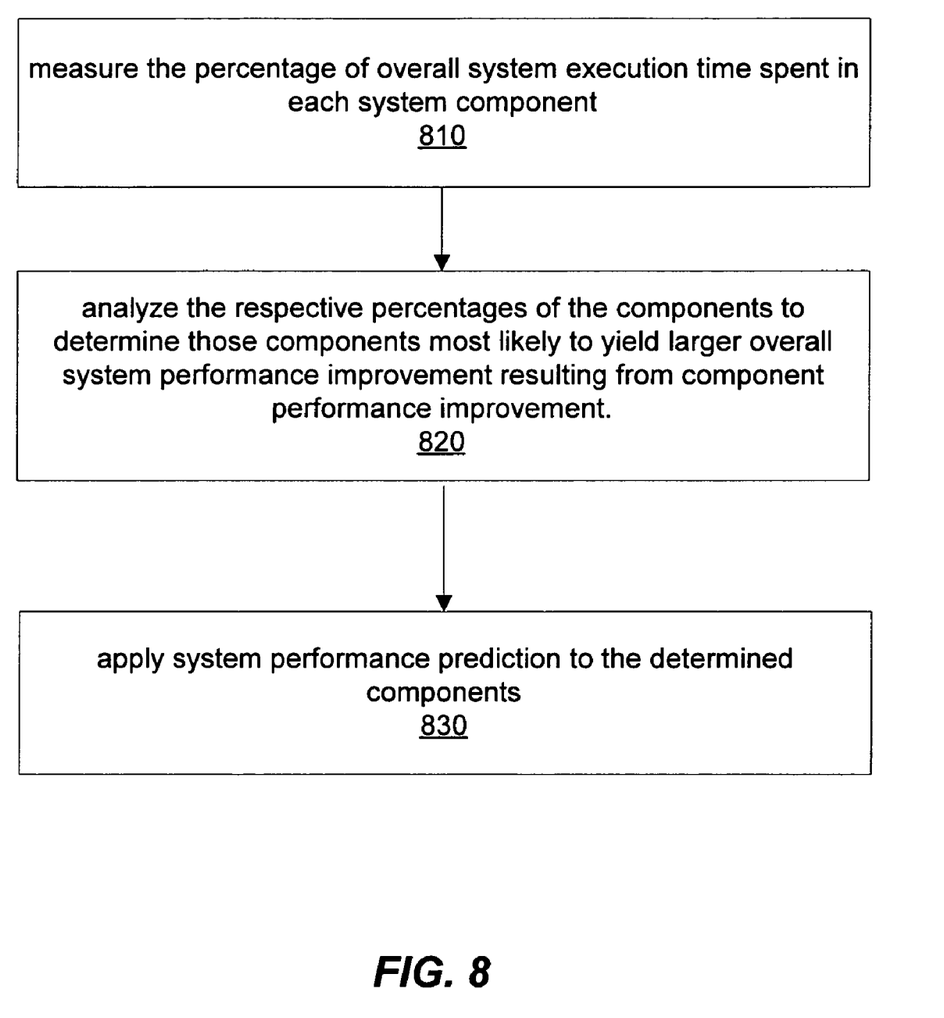
FIG. 8 is a flowchart illustrating one embodiment of a method for determining system components more likely to yield overall system performance improvements, as described herein.

FIG. 8 is a flowchart illustrating one embodiment of a method for determining components of a system to analyze using system performance prediction, as described herein. In one embodiment, the amount of execution time, as a percentage of the overall system execution time, is spent in each of various system components, as illustrated by block 810. In some embodiments, every system component may be analyzed to determine the amount of overall system execution time spent in each component. In other embodiments, however, only a select number of components may be so analyzed.

Any of numerous manners may be used to determine the percentage of total system execution time that is spent in each of various system components, according to various embodiments. In one embodiment, benchmark-measuring software, such as SPECWEB99, may be used to determine the amount of execution time spent various components of a system. In other embodiments, however, individual time recording program instructions may be inserted into each component and used to measure the amount of execution time spent in each component. The results of the inserted instructions may then be compared to the overall system execution time to determine each components execution time as a percentage of the overall system execution time.

The execution time of each component of a system, or of each component whose execution time was analyzed, may be used to determine which components to analyze using system performance prediction. For example, perhaps one component uses a larger percentage of overall system execution time than other components. That component may be a good candidate for analysis using system performance prediction, according to one embodiment. In other embodiments, the execution time for a number of components may be a larger percentage of total system execution time than a group of other components.

When determining which components of a system to analyze using system performance prediction, as described herein, the relative percentages of overall system execution time used by each component may be analyzed. Thus, the respective percentages of the components may be analyzed to determine those components most likely to yield larger overall system performance improvement resulting from component performance improvement, as illustrated by block 820. After determining one or more components likely to yield larger overall system performance increases, as described above, system performance prediction may be applied to those components, as illustrated by block 830.

While the method illustrated by FIG. 8 refers to execution time of a component as a percentage of overall system execution time, the method described above and illustrated by FIG. 8 may also be applied to other system resources, according to various embodiments, as with system performance prediction in general. For example, in on embodiment, the memory usage of each component as a percentage of overall system memory usage may be analyzed to determine which system components have a larger potential for improvement of total system memory usage. Additionally, the method illustrated by FIG. 8 may be automatically performed by system performance predictor 120 in some embodiments, but may also be performed manually, according to other embodiments.

Figure 9:
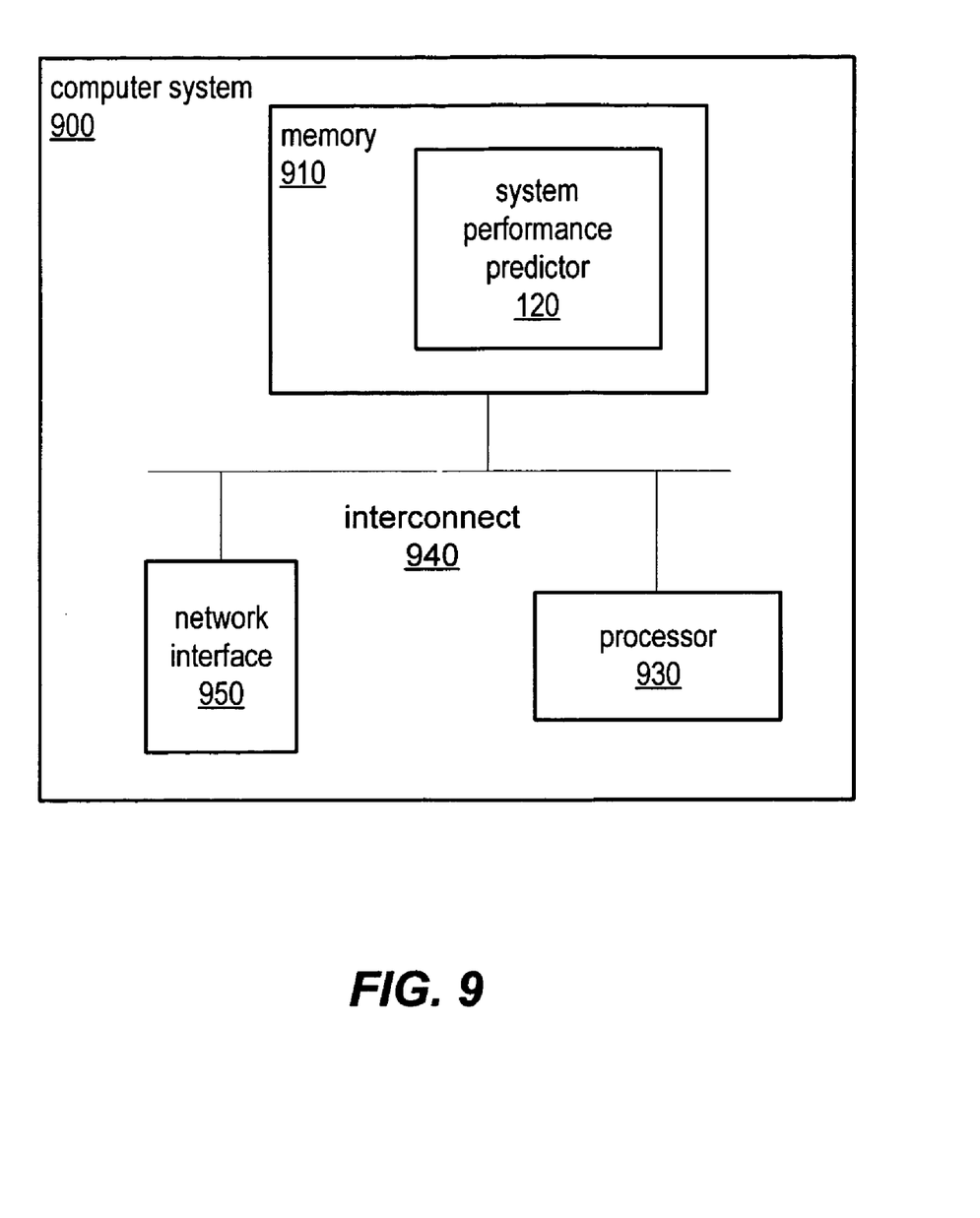
FIG. 9 is a block diagram illustrating an exemplary computer system capable of implementing system performance prediction, according to one embodiment.

FIG. 9 illustrates a computing system capable of implementing system performance prediction, as described herein and according to various embodiments. Computer system 900 may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device. Computer system 900 may include at least one processor 930. Processor 930 may couple across interconnect 940 to memory 910.

Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Processor 930 may also couple across interconnect 940 to network interface 950 that in turn may be configured to communicate across various networks, such as network 100, illustrated in FIG. 1. Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments.

In some embodiments, memory 910 may include program instructions configured to implement system performance prediction, as described herein. In certain embodiments memory 910 may include program instructions configured to implement a system performance predictor, such as system performance predictor 120. In such embodiments, system performance predictor 120 may include program instructions configured to implement system performance prediction, as described herein. A system performance predictor may be implemented in any of various programming languages or methods. For example, in one embodiment, system performance predictor 120 may be JAVA based, while in another embodiments, system performance predictor tool 120 may be implemented using HTML and web browser technology. In other embodiments, system performance predictor 120 may be written using the C or C++ programming languages.

Although the embodiments above have been described in detail, numerous variations and modifications will become apparent once the above disclosure is fully appreciated. It is intended that the following claims be interpreted to embrace all such variations and modifications.

What is claimed is:

1. A method for predicting an overall system performance change based on changes to an individual component, comprising:

inserting a plurality of performance degradations of different magnitude values relative to a baseline value into a component of a software system, wherein the software system comprises a plurality of components;

for each inserted performance degradation, measuring a respective overall system performance change corresponding to the inserted performance degradation;

constructing a best-fit function for data representing the individual magnitude value of each individual performance degradation related to a value of the overall system performance change resulting from each individual performance degradation; and extrapolating the best-fit function to one or more data points each representing a potential performance improvement and each having a negative value as opposed to the magnitude values for the performance degradations to determine one or more predicted values of expected overall system performance change expected from implementing the one or more respective potential performance improvements to the component without actually implementing the one or more respective potential performance improvements to the component.

2. The method of claim 1, wherein said inserting a plurality of performance degradations comprises instrumenting the component to insert one or more program instructions configured to implement each of the performance degradations.

3. The method of claim 1, wherein each of the plurality of performance degradations comprises a delay in execution time.

4. The method of claim 1, wherein said extrapolating comprises:

determining one or more pairs of predicted system performance increases and respective required component performance increases for the component.

5. The method of claim 1, wherein the best-fit function comprises a straight-line function.

6. The method of claim 1, further comprising determining a baseline benchmark system performance measurement for the software system prior to said inserting a plurality of performance degradations, wherein the system performance changes comprise percentages of the baseline benchmark system performance measurement.

7. The method of claim 6, wherein said determining a baseline benchmark system performance measurement for the software system comprises measuring a benchmark performance measurement for the component.

8. The method of claim 1, wherein said extrapolating comprises determining a predicted performance percentage increase for the component required to obtain a desired system performance percentage increase for the software system.

9. The method of claim 1, further comprising:
- performing said inserting, said determining, said constructing, and said extrapolating for two or more components of the plurality of components to determine one or more predicted overall system performance increases for each of the two or more components corresponding to one or more respective performance improvements in each of the two or more components; and
- ranking the two or more components according to their respective one or more predicted overall system performance increases and respective one or more performance improvements.

10. The method of claim 9, further comprising applying software development resources to the two or more components according to said ranking.

11. The method of claim 9, further comprising receiving user input specifying the two or more components.

12. The method of claim 9, further comprising automatically determining the two or more components based on a common program component accessed by each of the two or more components.

13. The method of claim 9, further comprising automatically determining the two or more components based on a common program component accessing each of the two or more components.

14. A system for predicting an overall system performance change based on changes to an individual component, comprising:
- a processor; and
- a memory coupled to the processor, wherein the memory comprises program instructions executable by the processor to:
  - insert a plurality of performance degradations of different magnitude values relative to a baseline value into a component of a software system, wherein the software system comprises a plurality of components;
  - for each inserted performance degradation, measure a respective overall system performance change corresponding to the inserted performance degradation;
  - construct a best-fit function for data representing the individual magnitude value of each individual performance degradation related to a value of the overall system performance change resulting from each individual performance degradation; and
  - extrapolate the best-fit function to one or more data points each representing a potential performance improvement and each having a negative value as opposed to the magnitude values for the performance degradations to determine one or more predicted values of expected overall system performance change expected from implementing the one or more respective potential performance improvements to the component without actually implementing the one or more respective potential performance improvements to the component.

15. The system of claim 14, wherein, in inserting a plurality of performance degradations, the program instructions are further configured to instrument the component to insert one or more program instructions configured to implement each of the performance degradations.

16. The system of claim 14, wherein, in said extrapolating, the program instructions are further configured to:
- determine one or more pairs of predicted system performance increases and respective required component performance increases for the component.

17. The system of claim 14, wherein the program instructions are further configured to:
- perform said inserting, said determining, said constructing, and said extrapolating for two or more components of the plurality of components to determine one or more predicted overall system performance increases for each of the two or more components corresponding to respective one or more performance improvements in each of the two or more components; and
- rank the two or more components according to their respective one or more predicted overall system performance increases and respective one or more performance improvements.

18. A computer accessible medium, comprising program instructions for predicting an overall system performance change based on changes to an individual component, wherein the program instructions are computer-executable to implement:
- inserting a plurality of performance degradations of different magnitude values relative to a baseline value into a component of a software system, wherein the software system comprises a plurality of components;
- for each inserted performance degradation, measuring a respective overall system performance change corresponding to the inserted performance degradation;
- constructing a best-fit function for data representing the individual magnitude value of each individual performance degradation related to a value of the overall system performance change resulting from each individual performance degradation; and
- extrapolating the best-fit function to one or more data points each representing a potential performance improvement and each having a negative value as opposed to the magnitude values for the performance degradations to determine one or more predicted values of expected overall system performance change expected from implementing the one or more respective potential performance improvements to the component without actually implementing the one or more respective potential performance improvements to the component.

19. The computer accessible medium of claim 18, wherein, in inserting a plurality of performance degradations, the program instructions are computer-executable to implement instrumenting the component to insert one or more program instructions configured to implement each of the performance degradations.

20. The computer accessible medium of claim 18, wherein, in said extrapolating, the program instructions are computer-executable to implement:
- determine one or more pairs of predicted overall system performance increases and respective required component performance increases for the component.

21. The computer accessible medium of claim 18, wherein the program instructions are computer-executable to implement:
- performing said inserting, said determining, said constructing, and said extrapolating for two or more components of the plurality of components to determine one or more predicted system performance increases for each of the two or more components corresponding to respective one or more performance improvements in each of the two or more components; and
- ranking the two or more components according to their respective one or more predicted system performance increases and respective one or more performance improvements.

* * * * *